(12) United States Patent
Kraft et al.

(10) Patent No.: US 11,322,917 B2
(45) Date of Patent: *May 3, 2022

(54) ARRANGEMENT COMPRISING A COMPARTMENT AND A SLIDE-IN MODULE

(71) Applicant: ABB Schweiz AG, Baden (CH)

(72) Inventors: Klaus Kraft, Heidelberg (DE); Hans-Juergen Schmitt, Hirschberg (DE); Markus Kesberger, Ludwigshafen (DE); Francoise Molitor, Zurich (CH)

(73) Assignee: ABB Schweiz AG, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,102

(22) Filed: Oct. 1, 2020

(65) Prior Publication Data

US 2021/0021109 A1     Jan. 21, 2021

Related U.S. Application Data

(63) Continuation of application No. PCT/EP2018/058621, filed on Apr. 4, 2018.

(51) Int. Cl.
*H02B 1/36* (2006.01)
*H05K 7/14* (2006.01)
*H02B 1/34* (2006.01)

(52) U.S. Cl.
CPC .............. *H02B 1/36* (2013.01); *H02B 1/34* (2013.01); *H05K 7/1432* (2013.01)

(58) Field of Classification Search
CPC ... H02B 1/21; H02B 1/34; H02B 1/36; H05K 7/1432

See application file for complete search history.

(56) References Cited

U.S. PATENT DOCUMENTS

| 3,470,422 | A | 9/1969 | Schneider et al. | |
|---|---|---|---|---|
| 7,170,747 | B2* | 1/2007 | Muirhead | G06F 1/182 312/265.1 |
| 7,417,848 | B2* | 8/2008 | Bergmann | H01R 25/16 337/191 |
| 7,419,394 | B2* | 9/2008 | Jensen | H05K 7/1452 439/248 |
| 8,047,383 | B2* | 11/2011 | Hendrix | H05K 7/1418 211/26 |
| 9,156,614 | B2* | 10/2015 | Ono | B65G 1/06 |
| 9,337,596 | B2* | 5/2016 | El Zakhem | H01R 25/162 |

(Continued)

FOREIGN PATENT DOCUMENTS

| CN | 1248383 A | 3/2000 |
|---|---|---|
| DE | 29909433 U1 | 7/1999 |

(Continued)

*Primary Examiner* — Robert J Hoffberg
(74) *Attorney, Agent, or Firm* — Leydig, Voit & Mayer, Ltd.

(57) ABSTRACT

An arrangement includes: a module insertable into a housing or removable from a housing; and a slide-in compartment for receiving the module. The module is reversibly removable from the slide-in compartment. At least one side wall and/or a compartment rear wall and/or a compartment base of the slide-in compartment in an inserted state of the module forms or form a side wall and/or rear wall and/or a base wall and/or a roof of at least one module.

8 Claims, 5 Drawing Sheets

(56) References Cited

U.S. PATENT DOCUMENTS

| | | | |
|---|---|---|---|
| 10,277,015 B2 * | 4/2019 | Choi | H02B 1/36 |
| 10,608,419 B2 * | 3/2020 | Bach | H02B 1/301 |
| 2010/0027196 A1 | 2/2010 | Schell et al. | |
| 2021/0021108 A1 * | 1/2021 | Schmitt | H02B 1/36 |
| 2021/0021109 A1 | 1/2021 | Kraft et al. | |

FOREIGN PATENT DOCUMENTS

| | | | | |
|---|---|---|---|---|
| DE | 20013226 U1 | 12/2000 | | |
| EP | 3211738 A1 | 8/2017 | | |
| FR | 2082369 A5 | 12/1971 | | |
| KR | 19980010870 U | 5/1998 | | |
| WO | WO-2016162018 A1 * | 10/2016 | | H01M 50/20 |
| WO | WO-2019192688 A1 * | 10/2019 | | H02B 1/36 |

\* cited by examiner

ARRANGEMENT COMPRISING A COMPARTMENT AND A SLIDE-IN MODULE

CROSS-REFERENCE TO PRIOR APPLICATION

This application is a continuation of International Patent Application No. PCT/EP2018/058621, filed on Apr. 4, 2018, the entire disclosure of which is hereby incorporated by reference herein.

FIELD

The invention relates to an arrangement comprising a module for sliding into a housing or for removal from a housing as well as a slide-in compartment for receiving the module.

BACKGROUND

Modules are known from the prior art which can be inserted into switchgear cabinets and can be removed from these again. Such modules can be inserted into a switchgear cabinet in the manner of a drawer and removed from this again. Modules of this type can carry electrical equipment, accommodate electrical equipment or be configured as such.

In practice there is a need for slide-in compartments and/or housings or cabinets which can be constructed as easily as possible, into which such modules can be inserted and removed again.

SUMMARY

In an embodiment, the present invention provides an arrangement, comprising: a module insertable into a housing or removable from a housing; and a slide-in compartment configured to receive the module, wherein the module is reversibly removable from the slide-in compartment, and wherein at least one side wall and/or a compartment rear wall and/or a compartment base of the slide-in compartment in an inserted state of the module forms or form a side wall and/or rear wall and/or a base wall and/or a roof of at least one module.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
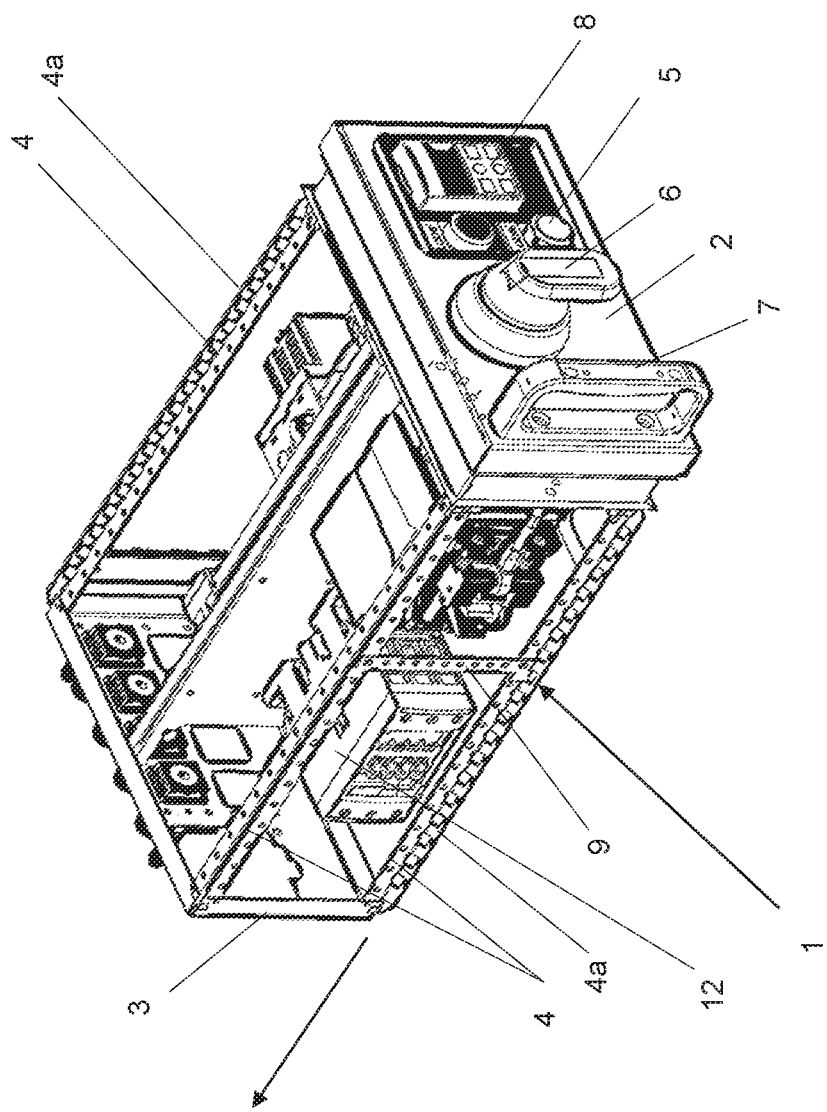
FIG. 1 shows a perspective view of a module which has a front wall and a rear wall, wherein the front wall and the rear wall are interconnected by four strip parts.

In an embodiment, the present invention provides an arrangement which is constructed with as few components as possible.

In an embodiment, the present invention provides an arrangement having the features described herein. According to this, the initially said arrangement is wherein the module is configured as reversible from the module which can be removed from the slide-in compartment, wherein at least one side wall and/or a compartment rear wall and/or a compartment base of the slide-in compartment in the slid-in state of the module forms or form a side wall and/or rear wall and/or a base wall and/or a roof of at least one module.

According to the invention, walls or bases of the slide-in compartment at the same time serve as walls or bases for a skeleton-like module, which itself has no side wall, no base wall and/or no roof at least on one side. As a result of a combination of module and slide-in compartment, different types of protection as far as IP54 can be achieved. This applies to the type of protection of an external shell but also to the type of protection inside a housing. The type of protection for different modules and slide-in compartments inside an arrangement can, if required, be designed differently for each assembly. This approach of a lower type of protection in the module with a higher type of protection by a shell is applied according to the invention to a "withdrawable" technique, namely a removable module.

Advantageously the slide-in compartment comprises a receiving opening, a compartment base and a roof, wherein the compartment base and the roof are configured as identical components. As a result of the combination of a module which is open at least in some regions and a closed slide-in compartment, the number of horizontal compartment bases can be reduced. Together with preferably cut-out compartment bases and dispensing with one roof per slide-in compartment, the ventilation is improved, the installation space is utilized more effectively and material saved.

A special roof or roof panel on the upper side of each slide-in compartment is dispensed with. The upper boundary is formed by the compartment base of a second slide-in compartment lying above a first slide-in compartment. This has the result that the installation space can be used more effectively and material is saved. Only the last, quasi-uppermost slide-in compartment at the upper end of the housing requires an additional roof as upper cover. As a result, a structure of a slide-in compartment having few components is implemented.

Advantageously at least one side wall is provided, which has two guide webs, wherein a lower guide web is assigned to or facing the compartment base and an upper guide web is assigned to or facing the roof. Guide legs of a module can lie or rest on these guide webs and be prevented from moving up and down. The guide webs are the short legs of a U-shaped side wall. A guide web can act as guide counter-element for the module.

Further advantageously the side wall is assigned a wall strip on the compartment base side and the side wall is assigned a wall strip on the roof side. The wall strips guide the guide legs laterally. In this respect, a wall strip can also act as guide counter-element for the module.

Advantageously the wall strip receives a spring element which extends in the direction of the interior of the slide-in compartment. A spring element can consist of metal or plastic. It is used to compensate for lateral tolerance of the module. A force is applied laterally to the module by a spring element. If a spring element is made of metal, it assists the earthing of the module.

Further advantageously the compartment base has a recess for receiving grid-like parts. These grid-like parts can promote air circulation.

A module which is configured as a so-called skeleton module has no side walls, no roof and no base wall. Modules of this type in which the electrical components carried by the module are substantially freely accessible, must be pushed into a slide-in compartment of the type described here for operational use. The slide-in compartment brings about a secure guidance of the module, ensures a correct contacting of electrical connections, brings about a secure locking and ensures that the type of protection is achieved.

The slide-in compartment must be installed in a shell or a housing which receives those components which allow the module to be connected to external consumers and with its control. Usually several slide-in compartments are placed in a control panel.

The slide-in compartment can be implemented in several ways. It can be executed as a single slide-in compartment, fitting exactly to a specific respective module or as a multiple slide-in compartment for several modules arranged adjacent to one another. A multiple arrangement of modules above one another is also feasible.

Advantageously an arrangement comprises a slide-in compartment of the type described here and a module for insertion into a housing or for removal from a housing, wherein the module comprises a base body having a front wall and a rear wall, wherein parallel elongate strip parts extend between the front wall and the rear wall, the longitudinal extension whereof spaces apart the front wall and the rear wall, and wherein at least one strip part has a guide leg for cooperation with a guide counter-element.

A strip part can have a carrying function and a guide function. A strip part substantially increases the torsional stability of a module during its movement. By this means, electrical devices such as for example contacts, switches or control units can be effectively protected. A strip part can cooperate with a guide counter-element in a slide-in compartment of a housing or switchgear cabinet in such a manner that the module is guided securely during insertion and removal.

Advantageously the guide leg projects freely outwards with an outer edge. Alternatively or additionally, the strip part has only one guide leg. This allows a particularly defined guidance of the module. A strip-like guide leg increases the bending stiffness of the strip part. A freely projecting guide leg additionally creates space for assembly elements such as screws.

Further advantageously the strip part has three legs, wherein the guide leg and two further mounting legs are each inclined with respect to one another and have a protruding outer edge. As a result the strip part has a type of star shape. The ray-like protruding mounting legs do not interfere with the guide leg when screws are fastened onto these.

Against this background, advantageously at least one mounting leg has at least one screw hole or a plurality of screw holes. As a result of a grid-like or pattern-like arrangement of screw holes on the strip parts, equipment can be fastened in the module in manifold ways. An adjustable mechanical coding of the modules is also made possible as a result.

Advantageously the guide leg has at least one recess. A recess or a plurality of recesses can constitute a mechanical coding so that a module can only be brought to a specific location in a housing or switchgear cabinet.

Further advantageously the strip part is configured to be Y-shaped in cross-section. Preferably all the strip parts are configured to be Y-shaped. This shape makes it possible to accommodate screws without the screw heads being able to impede the sliding function of the module. The Y shape brings about a high torsional stability and bending strength of the strip parts and/or the entire module.

Advantageously four strip parts are provided. The removable and movable module is designed so that four strip parts running depthwise, namely in the insertion direction, take over the mechanical connection of a front and a rear wall and also the guidance of the module in two directions. In this respect, a strip part is a carrying part and a guide part.

Further advantageously the front wall and the rear wall are interconnected by means of at least one strip part or by all the strip parts. The strip parts allow a good access to equipment which is accommodated inside the module.

Advantageously at least one strip part can be connected or is connected positively to the front wall and/or rear wall. The positive connection simplifies the assembly of the module. The preferably four Y-shaped strip parts are connected positively to the front and the rear wall and secured by riveting, screwing, latching or welding.

Further advantageously an arrangement comprises a module of the type described here and a housing, wherein the module can be moved in the insertion direction or removal direction and wherein the insertion direction and the removal direction are oriented parallel to at least one strip part. Thus, the module can be used in switching devices or switchgear cabinets. Uses in the low-voltage area are feasible. An IP43 type of protection can be achieved by using sealing strips. The size of the module is determined by the dimensions of the front wall and the rear wall.

The module, the slide-in compartment and/or the arrangement can be used in a low-voltage switching installation, in particular a low voltage switchgear.

The type of protection of the module can be IPxxB.

FIG. 1 shows a module for insertion into a housing 14 or for removal from a housing 14 comprising a base body 1 having a front wall 2 and a rear wall 3. Parallel elongate strip parts 4 extend between the front wall 2 and the rear wall 3, the longitudinal extension whereof spaces apart the front wall 2 and the rear wall 3, wherein at least one strip part 4 has a guide leg 4*a* for cooperation with a guide counter-element 18 shown in FIG. 3. The direction of insertion is shown by the arrow in FIG. 1.

The guide leg 4*a* projects freely outwards with an outer edge. The strip part 4 has only one guide leg 4*a*. Specifically four strip parts 4 are provided, wherein each strip part 4 has only one guide leg 4*a*.

The front wall 2 and the rear wall 3 are interconnected by all the strip parts 4. Each strip part 4 is positively connected to the front wall 2 and the rear wall 3. The front wall 2 and the rear wall 3 are made of metal in a contact-safe manner. The front wall 2 consists of two elements, wherein an inner element primarily takes over fastening functions and an outer element principally functions as an optical screen. Actuating devices for switching elements 5 and for a locking system 6 are arranged in the front wall 2. The actuating devices can be configured as two separate actuating devices or be combined in one device. A handle element 7 is furthermore fastened to the front wall 2.

In addition to a primary structure, a separately removable control unit is also located in the module. The operating and display panel 8 of the control unit is also located in the front wall 2 and therefore is easily accessible. The rear wall 3 is provided for fastening primary contacts, namely input and output, and control contacts.

At least one electrical device 12 is accommodated inside the module. As a result of the skeleton structure of the module which is created by the strip parts 4, electrical equipment inside the module is readily accessible.

Two strip parts 4 are interconnected by a transverse strut 9. The transverse strut 9 is oriented substantially orthogonally to the strip parts 4 but can also have a different inclination relative to the strip parts 4. The transverse strut 9 prevents sagging of long strip parts 4.

Figure 2:
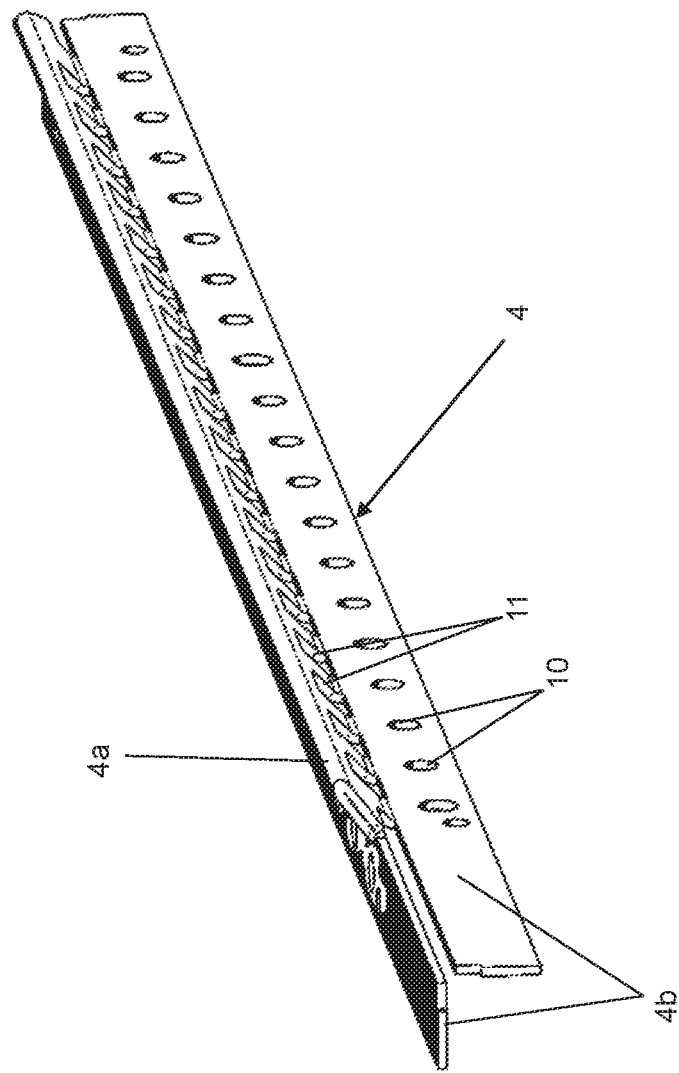
FIG. 2 shows a perspective detailed view of a strip part which is configured to be Y-shaped.

FIG. 2 shows in a perspective view a strip part 4 as installed in the module according to FIG. 1.

The strip part 4 has three legs, wherein the guide leg 4a and two further mounting legs 4b are each inclined with respect to one another and each have a freely projecting outer edge.

The outer edge of the guide leg 4a is rounded. The guide leg 4a is formed by folding.

Each mounting leg 4b has a plurality of screw holes 10. The guide leg 4a has a plurality of recesses 11. The strip part 4 is configured to be Y-shaped in cross-section.

Figure 3:
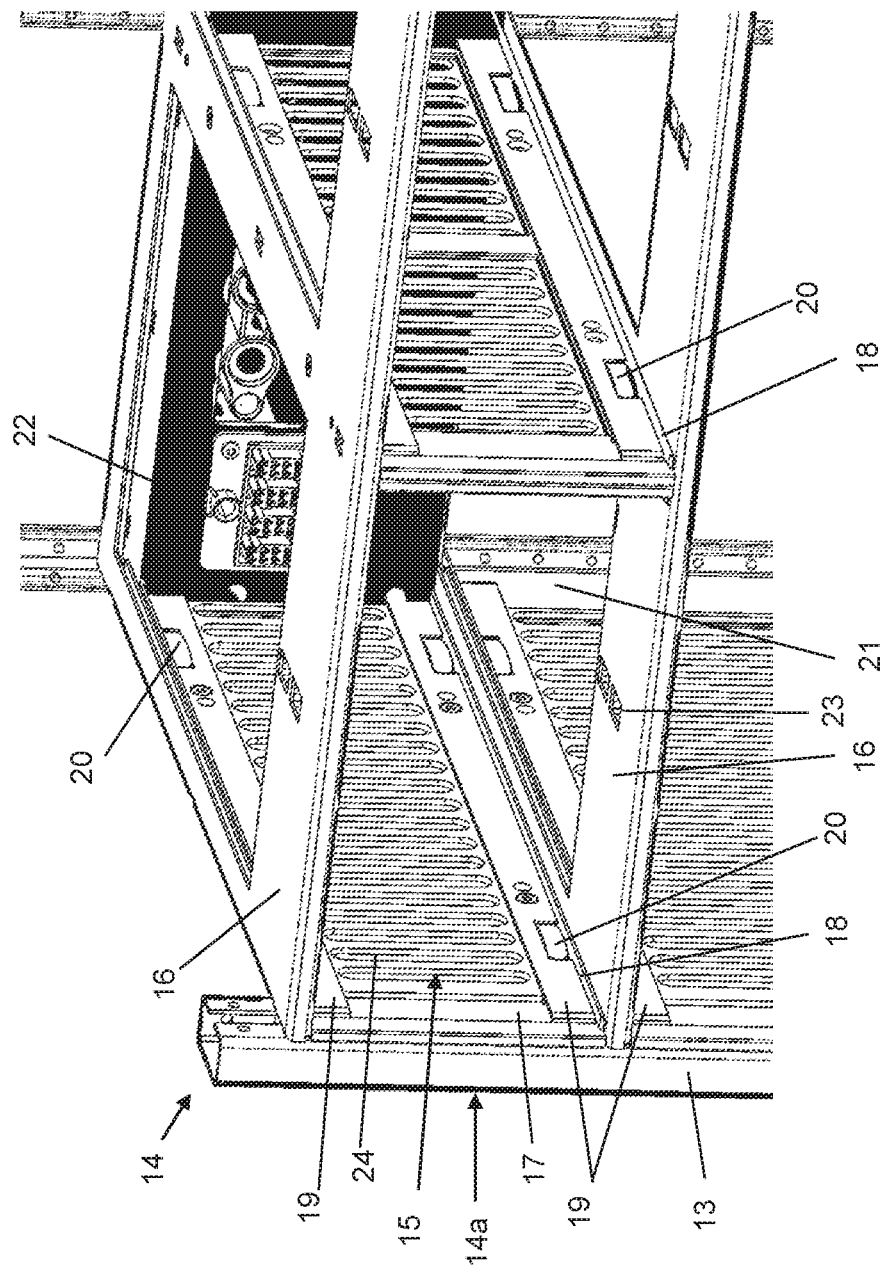
FIG. 3 shows a diagram of a slide-in compartment in which the module according to FIG. 1 can be inserted.
Figure 4:
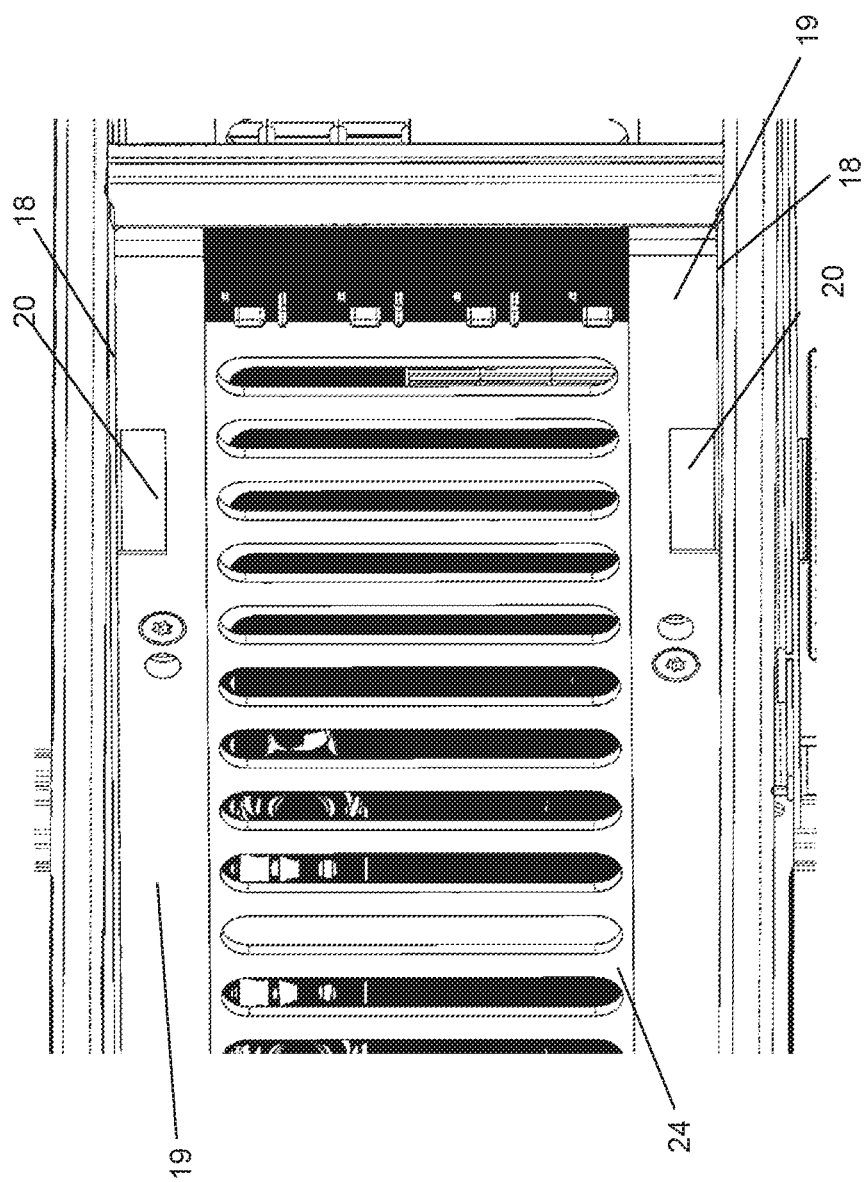
FIG. 4 shows a detailed and sectional view of the slide-in compartment according to FIG. 3.

FIG. 3 shows a slide-in compartment 14a for receiving a module, comprising a receiving opening 15, a compartment base 16 and a roof 16.

The compartment base 16 and the roof 16 are configured as identical components.

At least one side wall 17 is provided, which has two guide webs 18, wherein a lower guide web 18 is assigned to or facing the compartment base 16 and an upper guide web 18 is assigned to or facing the roof 16.

The side wall 17 is assigned a wall strip 19 on the compartment base side. The side wall 17 is assigned a further wall strip 19 on the roof side.

The wall strip 19 receives a spring element 20 which extends in the direction of the interior of the slide-in compartment 14a.

The compartment base 16 has a recess 21 for receiving grid-like parts.

The slide-in compartment 14a is configured constructively as a metal sleeve which is open at the front. The sleeve comprises a bottom sheet as compartment base 16 and a roof sheet as roof 16, wherein the sheets are connected to side walls 17.

Located at the rear end of the slide-in compartment 14a is a compartment rear wall 22 which receives components for contacting. If these components for contacting are arranged in a surrounding control panel, this compartment rear wall 22 can however be completely or partially omitted.

The slide-in compartment 14a described here is formed by a compartment base 16 which is fastened in the control panel. The compartment base 16 has large recesses 21 which can receive grid-like parts which are necessary for achieving the type of protection required in each case. Further cut-outs 23 enable a fixing and/or locking of the module in its respective positions.

These positions are usually the so-called separating position in which a secure separation of the electrical contacts is achieved and the so-called operating position in which a completely connected contacting is achieved.

A delimitation to the left and right is accomplished by U-shaped side walls 17 which are likewise provided with large cut-outs for air circulation and receiving protection-type elements.

The short legs of these U-shaped side walls, namely the guide webs 18 act at the bottom and at the top as guidance for the strip parts 4 of the module having a Y-shaped cross-section but only in the upward and downward movement.

The lateral guidance of the module is taken over by four wall strips 19 which are configured as plastic strips. The plastic strips are arranged in each corner of the slide-in compartment 14a. They sit on the short legs of the U-shaped side walls 17 and positively connect the otherwise still loose side walls 17 to the lower compartment base 16 and the upper compartment base 16.

For fixing the plastic strips these are screwed to the side walls 17. The plastic strips are configured so that they can receive spring elements 20. These spring elements 20 can consist of metal or plastic. They are used for lateral compensation of the tolerance of the modules. Specifically eight spring elements 20 are provided in a slide-in compartment 14a. A spring element 20 is configured to be rectangular and flat.

If the spring elements 20 are made of metal, they assist the earthing of the modules. Further functions of the plastic strips are the fixing of the grid-like parts 24 to achieve the type of protection in the lateral direction and the fastening of a counterpiece for mechanical coding of the modules.

The housing 14 in which the slide-in compartments 14a are arranged or configured is not restricted to a configuration as a switchgear cabinet but can be configured as any container or shelf into which modules can be slid.

The module according to FIG. 1 is configured in this respect as slide-in module and configured in the manner of a drawer.

Figure 5:
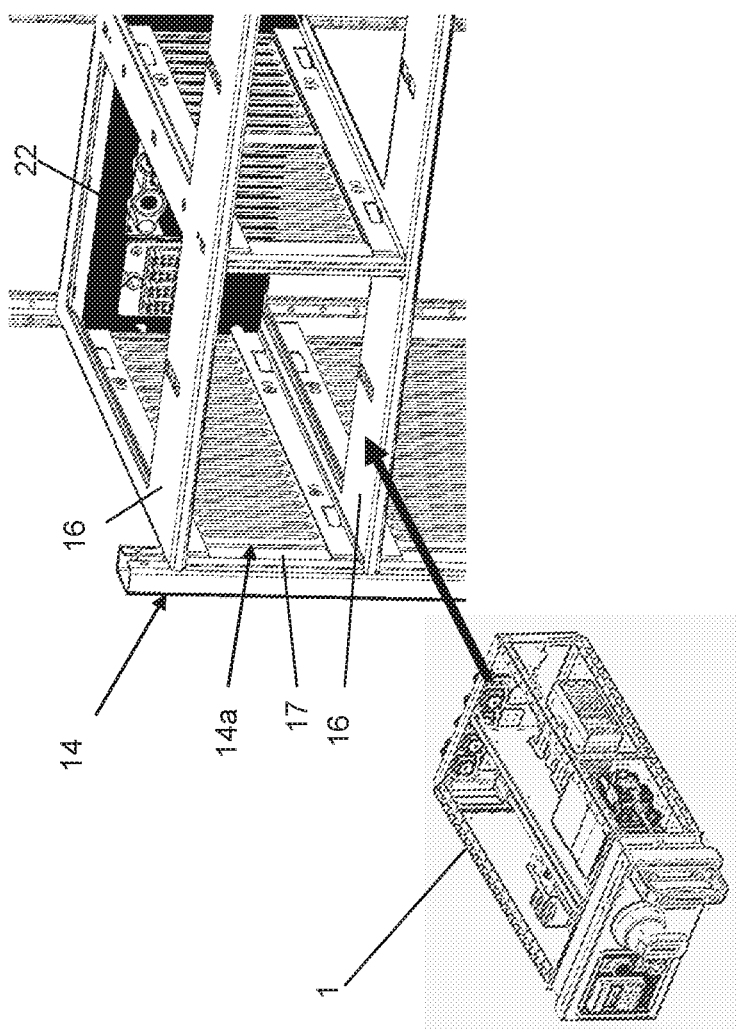
FIG. 5 shows a perspective view of an arrangement which comprises a module and a slide-in compartment of a housing.

FIG. 5 shows in perspective view an arrangement comprising the module according to FIG. 1 for insertion into the housing 14 or for removal from the housing 14 as well as the slide-in compartment 14a for removing the module. The module is configured as a module which is reversibly removable from the slide-in compartment 14a, wherein at least one side wall 17 and a compartment base 16 of the slide-in compartment 14a in the inserted state of the module form a side wall and a roof of the module.

The skeleton-shaped structure of the module ensures that the air circulation which is used for the cooling of components or electrical equipment is disturbed as little as possible.

The slide-in compartment 14a described here is formed by a compartment base 16 which is fastened in a control panel. It has large recesses 21 which can receive grid-like parts which are necessary to achieve the type of protection required in each case.

The slide-in compartment 14a described here dispenses with a special roof panel on the upper side of each slide-in compartment 14a. The upper boundary is formed by the compartment base 16 of the slide-in compartment 14a located thereabove. Only the last slide-in compartment 14a requires an additional compartment base 16 at the upper end as upper cover.

The boundary to the left and right is provided by side walls 17 which can also be provided with or without large cut-outs for the air circulation and receiving protection type elements.

Depending on the parts used, a type of protection of the combination side-base-roof up to IP54 can be achieved.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

| | |
|---|---|
| 1 | Base body |
| 2 | Front wall |
| 3 | Rear wall |
| 4 | Strip part |
| 4a | Guide leg |
| 4b | Mounting leg |
| 5 | Actuating device for switching elements |
| 6 | Actuating device for locking system |
| 7 | Handle element |
| 8 | Operating and display panel |
| 9 | Transverse strut |
| 10 | Screw hole |
| 11 | Recess |
| 12 | Electrical device |
| 13 | Support Post |
| 14 | Housing |
| 14a | Slide-in compartment |
| 15 | Receiving opening |
| 16 | Compartment base, roof |
| 17 | Side wall |
| 18 | Guide web of 17 |
| 19 | Wall strip |
| 20 | Spring element |
| 21 | Recess |
| 22 | Compartment rear wall |
| 23 | Cut-out |
| 24 | Grid-like part |

What is claimed is:

1. An arrangement, comprising:
    a module insertable into or removable from a housing; and
    a slide-in compartment configured to receive the module, the slide-in compartment comprises a receiving opening,
    wherein the module is reversibly removable from the slide-in compartment,
    wherein the module has at least a partial open skeleton structure,
    wherein at least one of at least one compartment side wall, a compartment rear wall, a compartment base, or a compartment roof forms at least one module side wall, a module rear wall, a module base, or a module roof, respectively, when the module is inserted into the housing,
    wherein the compartment roof is configured with identical components as the compartment base, and
    wherein the at least one compartment side wall comprises a lower guide web facing the compartment base and an upper guide web assigned to or facing the compartment roof.

2. The arrangement according to claim 1, wherein the at least one compartment side wall is assigned a first wall strip on a side of compartment base and assigned a second wall strip on a side of compartment roof.

3. The arrangement according to claim 2, wherein at least one of the first wall strip or the second wall strip receives a spring element which extends in an insertion direction of the slide-in compartment.

4. The arrangement according to claim 1, wherein the compartment base has a recess configured to receive grid-like parts.

5. The arrangement according to claim 1, wherein the module comprises a base body incorporating a module front wall and the module rear wall wherein parallel elongate strip parts extend between the module front wall and the module rear wall, a longitudinal extension whereof spaces apart the module front wall and the module rear wall, and wherein at least one of the parallel elongate strip parts has a guide leg configured to cooperate with a guide counter-element.

6. The arrangement according to claim 5, wherein at least one of an outer edge of the guide leg projects freely outwards, or the at least one of the parallel elongate strip parts has only a single one of the guide leg.

7. The arrangement according to claim 5, wherein the at least one of the parallel elongate strip parts has three legs, the three legs comprising a single one of the guide leg and two mounting legs, and wherein each of the three legs inclined with respect to one another and have a projecting outer edge.

8. The arrangement according to claim 5, wherein the at least one of the parallel elongate strip parts is Y-shaped in cross-section.

* * * * *